March 20, 1945. C. B. LEAPE ET AL 2,372,093
APPARATUS FOR TESTING ENAMELED WIRE
Filed Dec. 3, 1942 4 Sheets-Sheet 2
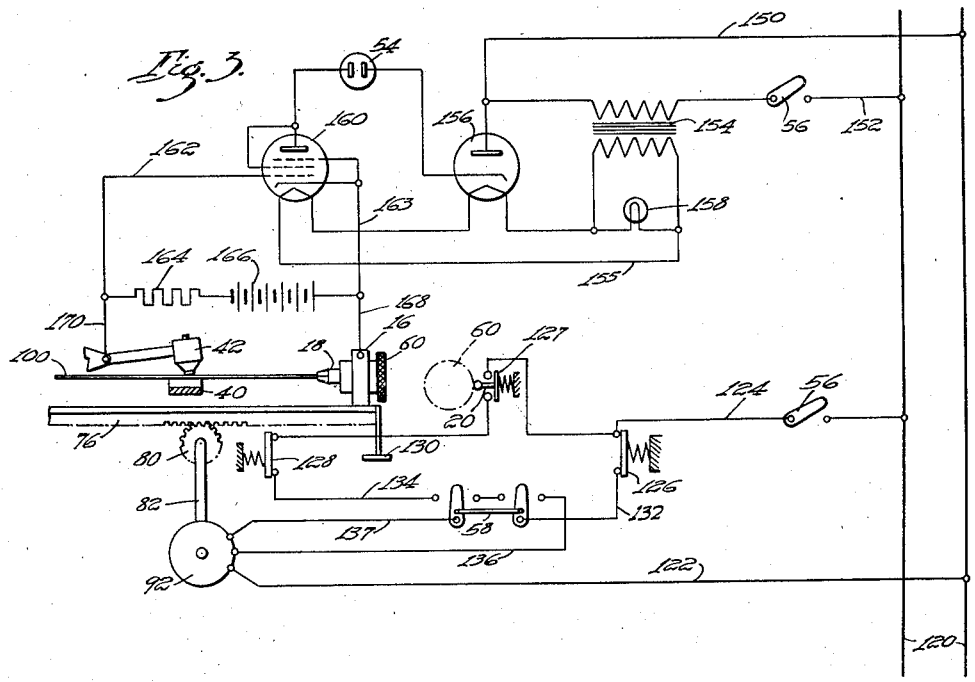
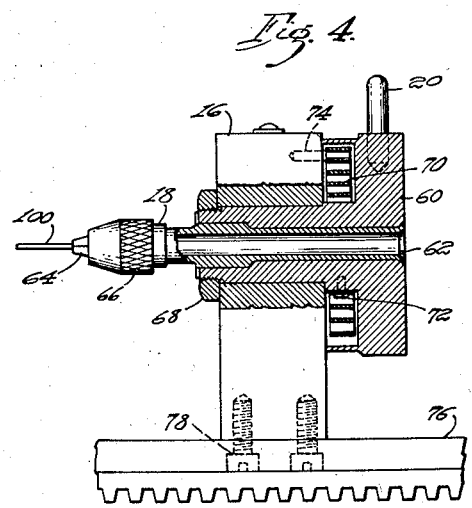
WITNESSES:
INVENTORS
Charles B. Leape and
Gerald R. Heywood.
BY
ATTORNEY

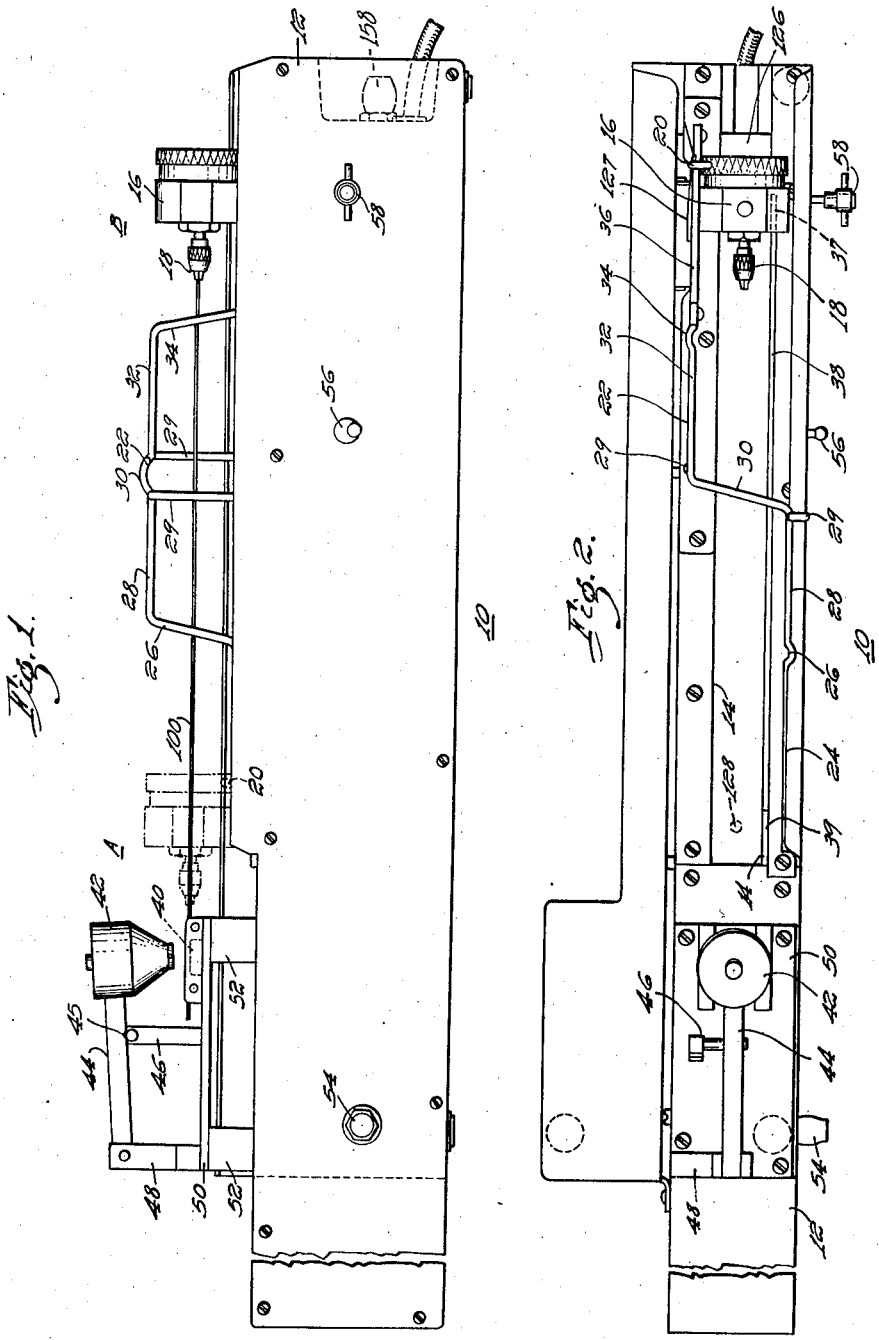

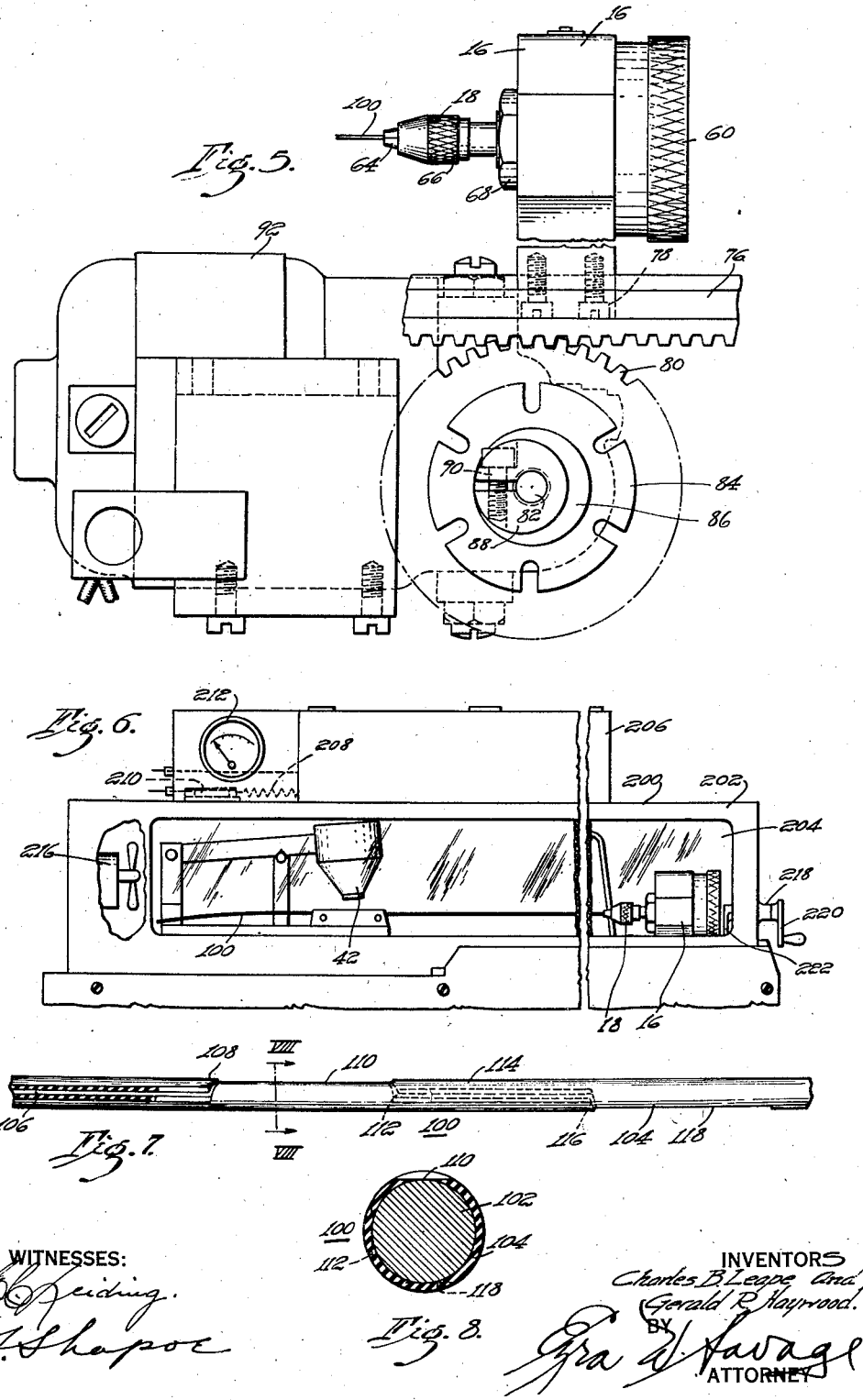

March 20, 1945. C. B. LEAPE ET AL 2,372,093
APPARATUS FOR TESTING ENAMELED WIRE
Filed Dec. 3, 1942 4 Sheets-Sheet 4
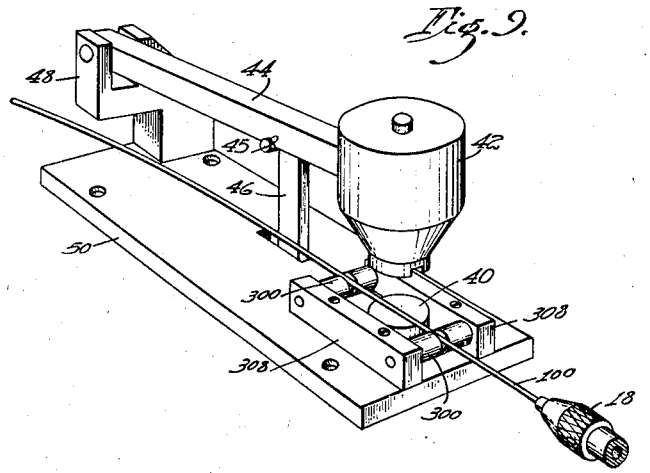
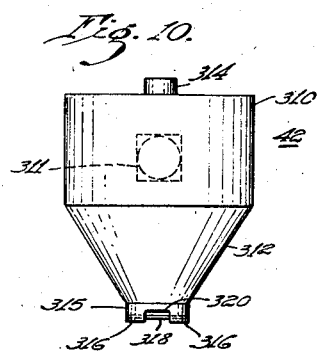
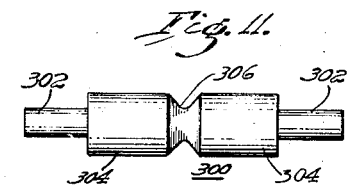
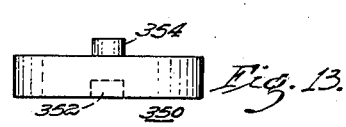
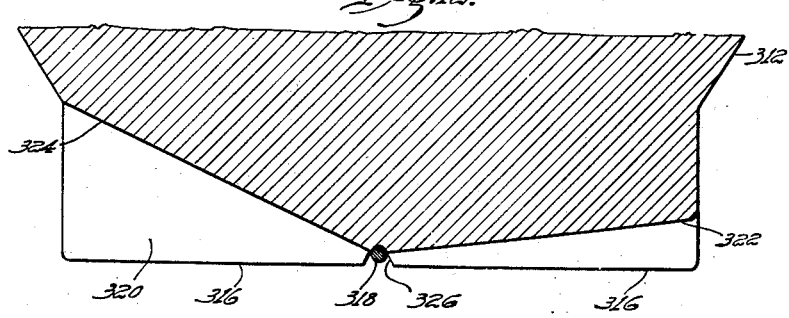
INVENTORS
Charles B. Leape and
Gerald R. Haywood.
BY
ATTORNEY Patented Mar. 20, 1945

2,372,093

UNITED STATES PATENT OFFICE 2,372,093

APPARATUS FOR TESTING ENAMELED WIRE

Charles B. Leape and Gerald R. Haywood, Forest Hills, Pa., assignors to Westinghouse Electric & Manufacturing Company, East Pittsburgh, Pa., a corporation of Pennsylvania Application December 3, 1942, Serial No. 467,736

15 Claims. (Cl. 73—7)

This invention relates to apparatus for testing enameled wire coatings in order to determine their physical properties.

In particular, this invention is directed to an apparatus for determining the toughness and hardness of applied enamels on conductors and the like. While the apparatus is most useful for determining the properties of enamel coatings on conductor wires to be employed in electrical apparatus, it is suitable for determining the physical properties of other types of coating compositions and organic finishes which may be applied to test wire specimens of suitable design for use in the apparatus.

An important characteristic of an enameled coating is its toughness. The toughness of the enamel coating greatly determines the extent to which the conductor with the applied coating can be stretched and deformed or subjected to other physical abuse without the enamel cracking or separating from the conductor. Therefore, an accurate determination of the relative toughness of such coatings is an important factor in selecting enamel wire or enamels for any given purpose.

It is usually accepted in the art that the best single measure of the toughness of enameled coatings is its resistance to scraping or abrasion under load. Accordingly an accurate determination or measurement of the scrape resistance or abrasion resistance of enameled coatings is of considerable importance in evaluating the relative toughness of the enamel insulation on an enameled conductor.

Heretofore, relatively simple manually operated devices were employed in determining the scape resistance of coatings of enamel on conductors. A knife edge capable of being weighted by different amounts and a base or anvil associated with the knife edge constitute the essential elements of such testing devices. In order to conduct a test a short length of enameled wire is placed between the weighted knife edge and anvil and the enameled wire is drawn under the knife edge. A visual examination of the enameled coating is made to determine whether or not the coating had been completely removed. If the enamel has not been removed or scraped off by the knife edge, a second sample of the same material is prepared and a heavier load applied to the knife edge. The tested wire is again examined visually to determine whether or not the enamel had been removed. Eventually a load high enough to remove the wire enamel is applied and the weight of this load is taken as the scrape resistance of the enamel.

It has been discovered that scrape values produced by the use of a manual testing device of this kind are quite erratic and not easily duplicated. The personal factor is exceedingly high and different individuals running a test secure unexpectedly large variations in scrape values for the same type of enameled wire. As an example of the erratic and undependable results with hand-operated scrapers, the following table is typical. The wire which was used for this test was size No. 19, 0.0377" in diameter, and was rated as a 25 oz. scrape enamel wire by a control laboratory. The testing scraper was a standard type of apparatus employed in the laboratories of most of the industry.

TABLE I

A. Normal rate of pull

| Scrape oz. | Abraded | Effect | Off |
|---|---|---|---|
| 20 | 4 sides abraded | | 1 side partially off. |
| 20 | 1 side abraded | | 3 sides off. |
| 20 | do | | Do. |
| 25 | | | 4 sides off. |
| 25 | | | Do. |
| 30 | | | Do. |
| 30 | | | Do. |

B. Fast rate (about double normal) of pull

| Scrape oz. | Abraded | Effect | Off |
|---|---|---|---|
| 20 | 3 sides abraded | | None off. |
| 20 | do | | Do. |
| 20 | do | | Do. |
| 25 | 4 sides abraded | | Do. |
| 25 | do | | Do. |
| 25 | do | | Do. |
| 30 | do | | Do. |
| 35 | do | | And 4 sides partially off. |

C. Changed angle of pulling

| Scrape oz. | Abraded | Effect | Off |
|---|---|---|---|
| 30 | 4 sides abraded | | None off. |
| 35 | do | | Do. |
| 40 | do | | Do. |

The notation "abraded" in the table indicates that the enameled coating when examined under the microscope had been removed in part but the copper conductor had not been reached by the knife edge. The notation "partially off" in the table indicates that in a few places the bare copper conductor had been reached, while the notation "off" indicates that enamel has been completely removed under the knife edge and the copper had been reached throughout the entire pull. In portion C of the table the wire was pulled up slightly during the test instead of applying a substantially horizontal direction of pull.

It will be seen that the results to be obtained by the use of the manually operated tester are subject to great variations depending on the rate at which the enameled wire is pulled past the knife edge as well as the direction in which it is pulled. These results do not indicate all the defects of this prior art type of apparatus but are indicative of some of the more obvious faults of the devices.

The object of this invention is to provide an apparatus for testing the physical properties of applied coatings on wire under such conditions that highly accurate and reproducible results are secured.

Another object of the invention is to provide an apparatus for testing enameled wire coatings automatically to give the physical property characteristics for a plurality of sides or areas of a single test specimen.

A further object of the invention is to provide an apparatus for determining the physical properties of enameled wire coatings that automatically gives an indication with substantially no time lag upon failure of the coating.

Other objects of the invention will, in part, be obvious and will, in part, appear hereinafter.

For a fuller understanding of the nature and objects of the invention reference should be had to the following detailed description and drawings, in which:

Figure 1 is an elevational view of the entire testing apparatus or machine;

Fig. 2 is a plan view of the apparatus of Fig. 1;

Fig. 3 is a wiring diagram;

Fig. 4 is an enlarged fragmentary elevation, partly in section, of the wire drawing chuck;

Fig. 5 is a fragmentary view in elevation showing the driving motor and chuck;

Fig. 6 is a partially broken fragmentary elevation of a thermostatically controlled enclosure for the testing machine;

Fig. 7 is an enlarged elevational view of a conductor after being subjected to test;

Fig. 8 is an enlarged sectional view taken on line VIII—VIII, of Fig. 7.

Fig. 9 is a perspective view of the scrape testing unit of the machine;

Fig. 10 is an enlarged view in elevation of the pressure head;

Fig. 11 is a view in elevation of one of the guide rollers in the testing head;

Fig. 12 is a greatly enlarged fragmentary view, partly in section, of the bottom portion of the pressure head; and, Fig. 13 is a view in side elevation of a weight.

According to this invention, a testing apparatus or machine has been produced that will test the scrape resistance of applied enamel coatings on wire or similar members in such a manner that highly accurate and reproducible results are secured. Among the features of this testing device are an accurately controlled rate of pull or drawing of the wire being tested under a suitably loaded pressure head, and a highly accurate maintenance of direction of pull of the wire. A further feature is secured by so manipulating the wire under test that a plurality of sides of the same wire are subjected to the load in a single test. In order to secure an immediate, accurate and automatic determination of whether or not the enamel coating has failed, a highly sensitive indicating means having substantially no time lag has been included in the apparatus. Numerous other desirable features are present, as will be ascertained from a reading of the specification.

Referring to Figs. 1 and 2 of the drawings, there is shown the assembled testing apparatus 10. The apparatus 10 comprises a base member 12 consisting of suitable plates and other members whose detailed construction is not shown. Supported on the base member 12 are two linear guides 14 as shown in Fig. 2. A linearly reciprocable member 16 is operatively associated with guideway 14 for movement thereon from position A to position B in Fig. 1.

The reciprocable member 16 carries a chuck 18 for gripping the enameled or coated wire 100 which is to be tested. The chuck 18 is relatively rotatable about the axis of the wire under test with respect to the reciprocable member 16. A follower 20 on the chuck controls the degree and amount of rotation of the chuck 18 in the member 16 in cooperation with the cam means 22 mounted on the base member 12 adjacent guides 14. The cam means 22 comprises a plurality of sections 24, 28, 32 and 36 substantially parallel to the guideway 14 and the direction of reciprocation of the member 16. The cam members 24, 28, 32, and 36, however, are each disposed successively substantially 90° apart with respect to the axis of the wire being tested. Intermediate these four parallel cam sections are a plurality of acutely angled sections 26, 30 and 34. Two intermediate support members 29 are applied to the cam means 22 adjacent the cam section 30. Under the urging of a spring 70 (Fig. 4) the follower 20 on the chuck 18 is controlled by the several sections of the cam means 22 to take different degrees of relative rotation as the reciprocable member 16 traverses the guideway from position A to position B. At the initial position A the follower 20 engages cam section 24 for several inches of linear travel during which the chuck 18 is relatively non-rotatable. Upon reaching angled section 26 of the cam the follower 20 is rapidly rotated until cam section 28 is engaged by the follower. The acute angle of section 26 restrains a violent jar when follower 20 engages section 28. For several inches of rearward movement, the chuck 18 is held non-rotatable by section 28 of the cam engaging follower 20. On reaching angled section 30 of the cam, a second relatively rapid rotation occurs until upon engaging portion 32 of the cam the chuck is again non-rotatable for several more inches of linear movement. Finally, the follower 20 moves relatively rapidly on reaching angled section 34 of the cam. No relative rotation of chuck 18 occurs in the final stage of the linear movement of the reciprocable member 18, during which time the follower 20 engages straight section 36. Thus in a complete reciprocation of the member 16 from position A to position B, the chuck 18 assumes four distinct positions 90° apart separated by three periods in which the chuck is rapidly rotated to a succeeding non-rotatable position. Wire held by the chuck is rotated in accordance with this movement whereby four different sections of each wire are tested during a complete reciprocation from A to B.

In returning the reciprocable member from position B to position A prior to initiating a subsequent test, the follower 20 is manually engaged and turned counter-clockwise as viewed from the right-hand side of Figs. 1 and 2. The follower 20 is held in this position for a short distance on its return path until the follower 20 is below and engages the end 37 of the guide 38. The guide 38 keeps the follower 20 from springing upward and engaging any of the portions of cam 22 in its return path. Upon approaching position A the follower 20 reaches the cutout 39 in the guide 38 and under the urging of spring 70 begins to rotate clockwise until the follower 20 again engages cam portion 24. At this point another coated wire specimen may be fitted into chuck 18 and a test made.

Disposed upon the base member 12 is an anvil 40 and a pressure head 42 for testing the actual scrape resistance of a given enameled coating on wire. The pressure head 42 is pivotally supported by means of the arm 44 mounted on the bracket 48 upstanding from the platform 50 supported in spaced relation to the base 12. The anvil 40 is also attached to platform 50. Pivotally supported on platform 50 is a rest 46 engaging arm 44 for supporting pressure head 42 some distance above the anvil 40 in order that wire 100 being tested may be easily inserted into the chuck 18 or removed therefrom. The rest 46 may be disengaged from the arm 44 by manually moving the rest 46 counter-clockwise from the position shown in Fig. 1. A notch 45 is present in arm 44 for engagement with the rest 46. Rest 46 may be manually rotated clockwise to cam arm 44 up until notch 45 is engaged.

At the front of the base member 12 is located a signal device 54 for indicating the failure of the enameled wire coating. The operation of the signal device 54 will be more fully detailed hereinafter. Likewise located on the front of the base member 12 is an electrical switch member 56 for turning current on and off from the several electrical members of the apparatus. Signal lamp 158 indicates whether the current is on or off. Mounted on base 12 is a reversing switch 58 whose operation will be more fully detailed hereinafter.

For a more complete description of the reciprocable member 16 and the chuck 18, reference should be had to Fig. 4 which is an enlarged view partly in section. The chuck 18 is nonrotatably attached to the head 60 through the agency of the hollow tube 62. The chuck 18 proper consists of a plurality of jaws 64, three being a convenient number. The sleeve 66 provides for releasing or tightening the jaws 64 about the enameled conductor 100. A nut 68 threadedly engaging the head 60 retains the chuck member 18 in position in the reciprocable member 16 while permitting relative rotational movement. Within the head 60 is located a powerful spring 70 which may be of any convenient design but is shown as a spiral spring in the illustration. One end of the spring 70 is fixed to the reciprocable member 16 by the pin 74 while the other end of the spring is fixed to the head 60 by the screw 72. The reciprocable member 16 is fixed to a guide rack 76 by fastening means 78. Guide rack 76 engages the guides 14 for movement thereon.

Reference should be had to Fig. 5 for an illustration of the power means for driving the reciprocable member at a predetermined rate from positions A to B on the guideway 14. The guide rack 76 carrying the reciprocable member 16 is driven back and forth by the gear 80 meshing therewith. The gear 80 is mounted on drive shaft 82 to which it is operatively but yieldably fastened by the Belleville spring washer 84, a common washer 86, and a threaded nut 88 engaging threads on shaft 82. The Belleville spring washer 84 may be so tightened by the nut 88 that a considerable frictional force is present to drive the gear 80 from shaft 82 under normal circumstances. In case of overloads or otherwise, the shaft 82 is capable of slipping with respect to the gear 80, thereby preventing damage to the chuck head or other parts of the apparatus. The nut 88 may be held in any desired position of threaded adjustment on shaft 82 by the set screw 90.

The motor 92 is a conventional geared-down type of motor. A satisfactory type of motor is a double worm reduction motor capable of driving the rack at a rate of the order of 2" a second. The motor and gear 80 are located within the base member 12 in a suitable position to engage the underside of the rack 76 and cause the rack to reciprocate in accordance with the position of reversing switch 58.

To provide for the proper operation of the testing apparatus 10 a number of controls and safety switches have been incorporated into an organization. Referring to Fig. 3 of the drawings, there is illustrated this organization. A source of power 120, for example, 110 volts, 60-cycle alternating-current, is used to operate the mechanism. Other sources of electrical energy, such as direct current from either batteries or a suitable generating source, will require the substitution of equivalent functioning means for those shown in Fig. 3.

Alternating current from power lines 120 is conducted to motor 92 by conductors 122 and 124. The reversing switch 58 provides for flow of current in either conductor 136 or 137 to cause the motor 92 to operate in one direction or the other, as desired. In causing the motor to operate clockwise as seen in Fig. 3, current from conductor 124 passes through limit switch 126 and conductor 132 to the reversing switch 58 from which it will flow through conductor 136. The limit switch 126 is normally closed, but is opened when the guide rack 76 and reciprocable member 16 are at the position B of Fig. 1 at which point stop member 130 engages the switch. The limit switch 126 prevents the operation of the motor to move the reciprocable member further to the right of position B. Current from conductor 124 may also flow to safety switch 127, thence to a second limit switch 128, to conductor 134 and to conductor 137 to cause the motor to operate in a direction retrograde of that produced when current flows in conductor 136.

The safety switch 127, also shown in Fig. 2, is operated by the follower 20 on the reciprocable member 16 when the member 16 is at position B. The purpose of the safety switch 127 is to prevent operation of the motor 92 upon reversing switch 58 to move reciprocable member 16 in the direction B—A in which case the follower 20 would automatically strike cam member 34 and possibly suffer damage. The second limit switch 128 when engaged by stop member 130 halts the electric motor 92 upon the reciprocable member 16 and guide rack 76 reaching position A. This switch automatically stops the guide rack in a position ready for the start of a test. The limit switches 126 and 128, as well as safety switch 127, may be of any suitable type. It has been found that limit switches of the type known to the trade, sensitive to movements of the order of hundredths of an inch, perform quite successfully in this service.

The operation of the motor driving circuit over a complete cycle is as follows. The reciprocable member 16 and chuck 18 are initially at position A with the stop member 130 engaging limit switch 128 to disrupt current flow in conductor 124 to conductor 134. The reversing switch 58 is at its extreme left-hand position at this time. After a test wire has been inserted in chuck 18 the pressure head 42 is released, and the test is to be initiated, the reversing switch 58 is moved to its extreme position to the right, connecting conductor 124, limit switch 126, and conductor 132 with conductor 136. The motor 92 operates in a clockwise manner as viewed in Fig. 3. The rack 76 and the reciprocable member 16 are moved to the extreme right, and the test is performed on the conductor 100. When position B is reached, the stop member 130 engages limit switch 126 and the flow of current is disrupted causing the motor to stop. At the same time, the safety switch 127 is actuated by the follower 20 thereby preventing the possibility of reversing the motor unless the follower has been moved out of position. After removing the wire 100 from the chuck 18, the follower 20 is manually rotated approximately 270° in a counter-clockwise direction and the reversing switch 58 is moved to its extreme left position. The motor rotates in a counter-clockwise direction since current will flow from conductor 124 through safety switch 127, through limit switch 128, and conductor 134 to conductor 137. The follower 20 need be held for only a small distance after the head begins its movement to the left. Upon reaching position A the stop member 130 again engages the limit switch 128, breaking the circuit and causing the motor 92 to cease operating.

To provide for giving an indication of a failure of the enamel coating on wire during the test an electrical circuit has been developed using an indicating device having substantially no time lag. This feature is important since a minute failure of the coating would not actuate indicating devices having appreciable time lag for their operation. As shown in Figure 3, current from the power source 120 is fed to the transformer 154 by means of conductors 150 and 152. The switch 56 provides for shutting the apparatus off when not in use. The glow lamp 158 is present in the secondary circuit 156 of the transformer 154 to indicate that the transformer is in operation. A rectifier 156 is employed to produce direct current for the purpose of operating the indicating device. Connected to the rectifier is one terminal of a gas glow lamp 54. A gas glow lamp is selected since it has substantially no time lag as well as requiring an exceedingly small electrical current of the order of 10 milliamperes to cause it to function.

An electronic relay device 160 is connected to the gas glow lamp 54 through its output circuit or furnishing current to the other line terminal of the lamp 54. The input circuit of the electronic relay 160 consists of the conductor 162, a high resistance 164 of the order of 5000 ohms, a source of direct-current voltage 166, and the conductor 163. The input circuit is so adjusted with respect to the relay device 160 that the relay device is in balance under normal circumstances and no current flows in the output circuit. In parallel with the resistance and source of power 166 is a conductor 170 connected to the testing head 42 and a conductor 168 electrically connected to the reciprocable member 16 and chuck 18. The conductor 100 is in conductive contact with the chuck 18 whereby on failure of the enameled coating on conductor 100, current will flow from the source 166 to the pressure head, thereby disturbing the balance in conductor circuit 162, thereby affecting the input to the relay 160 and thereby causing current to flow to the gas glow lamp 54. Thus, a very rapid indication of a failure of the enameled coating is obtained.

Referring to Fig. 9 of the drawings, there is illustrated in detail the several elements of the scrape testing device proper. Mounted on the platform 50 is the anvil 40 having a flat face over which wire being tested is drawn. Positioned above the anvil 40 is the pressure head 42 mounted on arm 44 for relative vertical movement to the anvil in the plane of the direction of movement of the wire during testing. The arm 44 may be supported in a position above the normal operating position of the head 42 by means of rest 46 engaging in slot 45 of the arm. The pressure head when elevated by the rest permits the insertion of wire 100 into the chuck 18 and its convenient removal. The bifurcated bracket 48 pivotally engages the end of arm 44 for the vertical movement of the arm and head 42.

In order to provide for a predetermined direction of movement of coated wire being tested, guide rollers 300 are mounted upon platform 50 in alignment with the anvil 40. The rollers 300 keep the wire being tested in a given horizontal and vertical plane. As shown in detail in Fig. 11, the guide rollers 300 comprise trunnions 302, a larger cylindrical portion 304 and a centrally grooved section 306 in which the wire under test rides. The trunnions 302 fit into appropriate apertures in blocks 308 fixed to the support 50. The wire guiding grooved section 306 is shown in Fig. 11 as consisting of a rounded channel. Fine wire will ride at the bottom of the rounded groove 306 and heavier wire will ride on the bottom and extend well up the sides of the groove 306. In some cases the groove 306 may be prepared as a square channel without any radius.

A detailed view of the pressure head 42 is shown in Figs. 10 and 12. The pressure head 42 includes a main cylindrical body 310 having a suitable aperture 311 at one side, into which arm 44 is fitted. Below the main body 310 an inverted conical section 312 is present. A pin or lug 314 at the top of the main body 310 provides for the secure positioning of additional weights to the pressure head 42 whereby to secure any desired weight on the head. These additional weights are similar to 350 as shown in Fig. 13 and have an aperture 352 fitting pin 314. Pin 354 is similar to pin 314. The extreme bottom of the pressure head 42 consists of a channelled portion 315 having two flat faces 316 normally resting on the anvil 40 when no wire is under test. Extending transversely across the channel 320 of the bottom portion 315 is the scrape member or knife edge 318 proper which scrapes the enamel coatings on wire being tested. The scrape member 318 is most conveniently a wire of a suitable hard metal, for example, piano wire or a tungsten carbide wire, where a long life is desired.

Fig. 12 is a greatly magnified view of a cross-section of the bottom portion of the pressure head 42 showing the relation of the parts to one another. The channel 320 consists of two sloping surfaces 324 and 322 sloping away from the point of contact with the scrape member 318. Preferably, the sloping surface 324 forms a relatively large angle to the face 316. This provides for the accumulation of a large quantity of enamel scrapings and the like without interfering with the operation of the pressure head 42. The wire 318 is disposed in a groove 326 of such dimensions that the wire is a few thousandths of an inch or other convenient distance above the faces 316. Thus whenever the pressure head 42 is resting on the anvil, no load will be imposed on the wire 318 thereby preventing damage to the wire or anvil. In the prior art type pressure heads, scrape wires have been attached to pressure members only at both ends, leaving the center portion of the wire free. This freedom results in the wire being flexed or bowed during each test. This is an undesirable feature, since it results in uncontrollable forces being set up. Undue wear of the hard metal wire also occurs.

The wire 318 is permanently attached throughout its entire length at the point of contact with the bottom of groove 326 by soldering, brazing or an equivalent permanent attachment. Excess solder which may have crept up the sides of the wire 318, particularly the portion extending in the channel 320, should be removed by carefully scraping or sand papering the excess solder away. An extremely rigid scrape member 318 is produced by following this practice. The advantages of the construction shown in Fig. 12 are obvious and will result in a prolonged life for the scrape member with increased accuracy and dependability over prior art types of members.

Referring to Figs. 7 and 8 of the drawings, there is shown in detail the results secured by testing an enamelled wire in the testing machine described herein. The wire 100 consists of an electrical conductor 102 of copper, for example, and an applied enamel coating 104. The illustration depicts a coating which was completely scraped off under the action of the pressure head 42. From Fig. 7 it will be evident, that the portion 106 was completely scraped off. At portion 108 the wire was rotated by the chuck approximately 90° and the wire was drawn for a second distance linearly to produce the scraped area 110. The wire was rotated at 112 for 90° and the wire was scraped linearly for the distance 114 and finally the wire was rotated a third 90° at 116 and the bottom section of the wire was scraped at 118. It will be seen that four sides of each conductor under test will be tested instead of the usual one side testing that is accomplished in conventional apparatus. It will be understood that a greater or lesser number of sides of any given enameled wire may be tested during one test. For example, 6 or even 8 sides may be tested by providing a suitable number of cams 22 on the testing machine.

If it is desired to test enameled wire under conditions of temperature or atmosphere different from those corresponding to room temperature and room conditions, a temperature control housing or enclosure 200 may be applied to the top of the testing machine 10 as shown in Fig. 6. The temperature control housing 200 extends substantially the full length of the machine and may be prepared of suitable heat insulating materials 202. For the purposes of keeping the mechanism under observation, a window 204 is provided in the front face of the housing 200. A hinged door 206 is provided for inserting and removing wire from the chuck 18 as tests are being made. To provide for heating the interior of the thermostatic cover, a heating element 208 and control therefor 210 are provided. The control 210 is preferably of the type that may be adjusted to give any predetermined temperature. The thermometer 212 is applied to the housing whereby the temperature may be kept under observation. A fan and motor 216 may be put inside the housing to secure a uniform temperature therein. To provide for rotating the chuck 18 when the reciprocable member 16 has reached the B position, a handle 220 is provided to rotate a shaft extending through the walls of the housing at the bushing 218. The handle 220 rotates the shaft to which is fixed a lever 222 engageable with the follower 20 (not shown in Fig. 6) inside the housing. Changes in design, proportion, size of the temperature control housing, will be obvious and need not be detailed herein.

In employing the testing apparatus, a sample of enameled wire 100 of suitable length is cut from a length to be tested. One end is sand papered, or scraped with a knife, or otherwise freed of the insulating enamel and the end of the conductor so prepared is put into the jaws 64 of the chuck 18 and the sleeve 66 applied to tighten the jaws to grip the conductor firmly. The reciprocable member 16 will be at position A. Pressure head 42 will be loaded with weights 350 as desired. The pressure head will be in an elevated position since it is supported by rest 46. The rest 46 is moved manually counter-clockwise until the pressure head rests on the conductor 100 with the scrape wire 318 in contact with the insulation. The switch 56 is turned to "on" position and the reversing switch 58 is turned to the extreme right position to provide for movement of the reciprocable member from A to B. In the movement of the reciprocable member 16, the follower 20 will guide the rotation of chuck 18 in a number of successive linear paths and an intermediate number of rotations giving a number of 90° turns to the chuck. When position B has been reached by the reciprocable member, the safety switch and the limit switch will cause the reciprocable member to stop. The sleeve 66 of the chuck 18 is turned to cause the jaw 64 to open and the tested wire is removed. During the test whenever the enamel coating fails, the gas glow lamp 54 will flicker or give off light indicating failure. If the coating does not fail, then a second sample will need to be tested, with a suitable additional weight 350 being placed on testing head 42 on pin 314. The reciprocable member 16 is returned to the A position by first rotating the chucks 18 270° counterclockwise and the motor rotation reversed. The follower 20 is maintained in this position by the guideway 38 until the cutout 39 is reached. The second sample may be applied and tested by repeating the procedure.

The testing apparatus 10 operates at a predetermined speed during the test, thereby avoiding errors in test due to differences in speed at which the wire is tested, as in manual devices. The chuck 18 is aligned with the guide rollers 300 and the anvil 40 whereby the wire is tested in a predetermined position, thereby avoiding errors due to misalignment. The pressure head 42 is pivotally mounted in alignment with the direction of movement of the wire 100 being tested, and it will not bind due to the wire being drawn by the head as has occurred with other types of pressure heads. A further advantage is the testing of a plurality of sides of the same conductor. As is well known to those working in the art, it is difficult to apply enamel to wires in an absolutely uniform manner. By testing a plurality of sides of given wire, it is possible more accurately to determine the physical condition of the enamel on each of the sides. As an example of the results obtained by the use of the apparatus 10, the following table is exemplary. The enamelled wire tested was a part of the coil of enamelled wire that was employed in preparing Table I.

TABLE II
[2 inches/second travel]

| Scrape oz. | Abraded | Effect | Off |
|---|---|---|---|
| 29 | 3 sides abraded | | None off. |
| 29 | No sides abraded | | |
| 29 | do | | |
| 30 | 1 side abraded | | None off. |
| 30 | 4 sides abraded | | 1 side partially off. |
| 30 | do | | Do. |
| 31 | 4 sides not abraded | | |
| 31 | do | | |
| 31 | do | | |
| 32 | 4th side abraded | | 3 sides off. |
| 32 | 2 sides abraded | | 1 side off. |
| 32 | do | | Do. |
| 33 | | | 4 sides off. |

It has been found in practice that the scrape testing machine of this invention is accurate to give scrape values to an ounce, that is, the machine will give significant results when the weight on the pressure head is varied by one ounce. By comparison, the manually operated testers cannot be depended on to this extent.

Since certain changes in carrying out the above processes and certain modifications in the apparatus which embodies the invention may be made without departing from its scope, it is intended that all the matter contained in the above description or shown in the accompanying drawings shall be interpreted as illustrative and not in a limiting sense. Therefore, it is desired that the invention be interpreted as broadly as possible and that it be limited only by what is set forth in the following claims.

We claim as our invention:

1. Apparatus for testing the abrasion and scrape resistance of applied electrically insulating coatings on wire or the like, comprising, in combination, a base member provided with a linear guideway, a reciprocable member having a chuck for gripping the wire being tested, the reciprocable member engaging the guideway for movement thereon, a driving means, the reciprocable member operatively connected to the driving means for movement along the linear guideway at a predetermined speed, an anvil member and an associated pressure member capable of applying pressure to wire under test so located on the base member with respect to the guideway and chuck that wire gripped by the chuck may be removed linearly across the anvil and pressure member under substantially similar conditions of relative position throughout the entire movement, a means for indicating the failure of the coating on the wire and a source of power in circuit relation with the pressure member, the chuck, the means for indicating and the wire being tested whereby when the insulating coating on the wire fails under pressure from the pressure member while being moved by the chuck the indicating means will be operated by the source of power.

2. Apparatus for testing the abrasion and scrape resistance of applied electrically insulating coatings on wire or the like, comprising, in combination, a base member provided with a linear guideway, a reciprocable member having a chuck for gripping the wire being tested, the reciprocable member engaging the guideway for movement thereon, a driving means, the reciprocable member operatively connected to the driving means for movement along the linear guideway at a predetermined speed, an anvil member and an associated pressure member capable of applying pressure to wire under test so located on the base member with respect to the guideway and chuck that wire gripped by the chuck may be removed linearly across the anvil and pressure member under substantially similar conditions of relative position throughout the entire movement.

3. Apparatus for testing the abrasion and scrape resistance of applied electrically insulating coatings on wire or the like, comprising, in combination, a base member provided with a linear guideway, a reciprocable member having a rotatable chuck for gripping the wire being tested, the reciprocable member engaging the guideway for movement therein, a driving means, the reciprocable member operatively connected to the driving means for movement along the linear guideway at a predetermined speed, means for rotating the chuck at predetermined positions along the guideway to cause wire being tested to be rotated, an anvil member and an associated pressure member capable of applying pressure to wire under test so located on the base member with respect to the guideway and chuck that wire gripped by the chuck may be moved linearly across the anvil and pressure member under substantially similar conditions of relative position throughout the entire movement, a means for indicating failure of the coating on the wire and a source of power in circuit relation with the pressure member, the chuck, the indicating means, and the wire being tested, whereby when the insulating coating on the wire fails under pressure from the pressure member while being moved by the chuck, the indicating means will be operated by the source of power.

4. Apparatus for testing the abrasion and scrape resistance of applied electrically insulating coatings on wire or the like, comprising, in combination, a base member provided with a linear guideway, a reciprocable member having a rotatable chuck for gripping the wire being tested, the reciprocable member engaging the guideway for movement therein, a driving means, the reciprocable member operatively connected to the driving means for movement along the linear guideway at a predetermined speed, means for rotating the chuck at predetermined positions along the guideway to cause wire being tested to be rotated, an anvil member and an associated pressure member capable of applying pressure to wire under test so located on the base member with respect to the guideway and chuck that wire gripped by the chuck may be moved linearly across the anvil and pressure member under substantially similar conditions of relative position throughout the entire movement.

5. Apparatus for testing the abrasion and scrape resistance of applied electrically insulating coatings on wire or the like, comprising, in combination, a base member provided with a linear guideway, a reciprocable member having a rotatable chuck for gripping the wire being tested, the reciprocable member engaging the guideway for movement therein, a driving means, the reciprocable member operatively connected to the driving means for movement along the linear guideway at a predetermined speed, spring means attached to the reciprocable member and the rotatable chuck to provide for relative rotation of the chuck, a follower on the chuck and a cam means on the base member cooperatively associated therewith to control the amount of the rotation of the chuck under the influence of the spring in accordance with the position of the reciprocable member along the guideway, an anvil member and an associated pressure member capable of applying pressure to wire under test so located on the base member with respect to the guideway and chuck that wire gripped by the chuck may be moved linearly across the anvil and pressure member under substantially similar conditions of relative position throughout the entire movement, means for indicating failure of the coating on the wire, and a source of power in electrical circuit relation with the pressure member, the chuck, the indicating means, and the wire being tested whereby when the insulating coating on the wire fails under pressure from the pressure member while being moved by the chuck the indicating means will be operated by the source of power.

6. Apparatus for testing the abrasion and scrape resistance of applied electrically insulating coatings on wire, or the like comprising, in combination, a base member provided with a linear guideway, a reciprocable member having a chuck for gripping the wire being tested, the reciprocable member engaging the guideway for movement therein, a driving means, the reciprocable member operatively connected to the driving means for movement along the linear guideway at a predetermined speed, a source of power to energize the driving means, means for connecting the source of power to the driving means including a plurality of means for connecting and disconnecting the source of power from the driving means, at least one of the connecting and disconnecting means being located at each end of the guideway and operable by the reciprocable member to disconnect the source of power when the reciprocable member reaches predetermined positions on the guideway, an anvil member and an associated pressure member capable of applying pressure to wire under test so located on the base member with respect to the guideway and chuck that wire gripped by the chuck may be moved linearly across the anvil and pressure member under substantially similar conditions of relative position throughout the entire movement, a means for indicating failure of the coating on the wire, and a source of power in electrical circuit relation with the pressure member, the chuck, the indicating means, and the wire being tested, whereby when the insulating coating on the wire fails under pressure from the pressure member while being moved by the chuck the indicating means will be operated by the source of power.

7. Apparatus for testing the abrasion and scrape resistance of applied electrically insulating coatings on wire or the like comprising, in combination, a base member provided with a linear guideway, a reciprocable member having a chuck for gripping the wire being tested, the reciprocable member engaging the guideway for movement therein, a driving means, the reciprocable member operatively connected to the driving means for movement along the linear guideway at a predetermined speed, an anvil member and an associated pressure member capable of applying pressure to wire under test so located on the base member with respect to the guideway and chuck that wire gripped by the chuck may be moved linearly across the anvil and pressure member under substantially similar conditions of relative position throughout the entire movement, a means for indicating failure of the coating on the wire, a source of power in electrical circuit relation with the pressure member, the chuck, the indicating means, and the wire being tested, whereby when the insulating coating on the wire fails under pressure from the pressure member while being moved by the chuck the indicating means will be operated by the source of power, a housing on the base member enclosing the reciprocable member, the linear guideway and the anvil and pressure member, a heating element in the housing, a temperature responsive control member for the heating element to provide for maintaining a predetermined temperature, within the housing and an air circulating member in the housing.

8. In an apparatus for testing the physical properties of applied coatings on wire, a reciprocable member, a chuck for holding the wire carried by the reciprocable member, the chuck being so disposed that it may be rotated on the reciprocable member, means for rotating the chuck and means for controlling the rotation of the chuck in relation with the movement of the reciprocable member.

9. In an apparatus for testing the physical properties of applied coatings on wire, a base member having a linear guideway, a reciprocable member mounted in the guideway for linear movement, a chuck for holding the wire carried by the reciprocable member, the chuck being so disposed that it may be rotated on the reciprocable member, means for rotating the chuck, a follower on the chuck for controlling the rotation of the chuck and a cam means on the base member restraining the follower for predetermined rotation of the chuck, the cam means including a plurality of linear portions parallel to the guideway thereby providing for non-rotation of the chuck when the follower is in contact therewith and other portions of the cam means so arranged that the follower executes a rotation of a fraction of a complete turn between successive linear portions whereby the wire gripped in the chuck is rotated to successively different positions.

10. In an apparatus for testing the physical properties of applied coatings on wire, a base member having a linear guideway, a reciprocable member mounted in the guideway for linear movement, a chuck for holding the wire carried by the reciprocable member, the chuck being so disposed that it may be rotated on the reciprocable member, a spring means having one end attached to the chuck and the other end attached to the reciprocable member to provide for rotating the chuck, a follower on the chuck for controlling the rotation of the chuck and a cam means on the base member restraining the follower for predetermined rotation of the chuck, the cam means including a plurality of linear portions parallel to the guideway thereby providing for non-rotation of the chuck when the follower is in contact therewith, and inclined portions on the cam means between the linear portions, the inclined portions so arranged that the follower is constrained to rotate at a predetermined speed to a succeeding linear portion, whereby when the chuck and wire held therein are travelling linearly along the guideway the wire is rotated a fraction of a complete turn between successive linear portions of the cam and does not turn when the follower engages the linear portions of the cam.

11. In an apparatus for determining the physical properties of applied coatings to wires at predetermined temperatures comprising a base member having an anvil and an associated pressure member to test the coating on the wire, a linearly reciprocable member on the base carrying a chuck relatively rotatable thereto, the chuck being adapted to grip and carry the wire across the anvil and associated pressure member, a housing on the base member covering the anvil and pressure member and the reciprocable member, the housing including a heating element, a temperature regulator for controlling the operation of the heating element, and air circulating means to secure temperature uniformity in the housing.

12. In an apparatus for determining the physical properties of applied coatings to wires at predetermined temperatures comprising a base member having an anvil and an associated pressure member to test the coating on the wire, a linearly reciprocable member on the base carrying a chuck relatively rotatable thereto, the chuck being adapted to grip and carry the wire across the anvil and associated pressure member, a housing on the base member covering the anvil and pressure member and the reciprocable member, the housing including a heating element, a temperature regulator for controlling the operation of the heating element, air circulating means to secure temperature uniformity in the housing, and a crank means extending through the walls of the housing for rotating the chuck.

13. In an apparatus for determining the physical properties of electrically insulating coatings on wire of a conductor metal, an indicating system operative to disclose failure of the insulating coating when tested by the apparatus comprising, in combination, a source of bias potential, an electronic relay connected to the source of bias potential, the electronic relay provided with an input circuit and an output circuit, means for connecting the conductor metal of the wire being tested in circuit relation with the source of the bias potential, a contact member disposed to engage the insulated wire, and an indicating device responsive to current flow in the output circuit of the electronic relay, the contact member, the means for connecting the conductor metal, and the conductor metal being disposed to establish an electrical circuit when the contact member makes electrical contact with the conductor metal to effect a change of bias potential, the change of bias potential producing a flow of current in the electronic relay from the input circuit to the output circuit whereby the indicating device is operated.

14. In an apparatus for determining the physical properties of electrically insulating coatings on wire of a conductor metal, an indicating system operative to disclose failure of the insulating coating when tested by the apparatus comprising, in combination, a source of bias potential, an electronic relay connected to the source of bias potential, the electronic relay provided with an input circuit and an output circuit, means for connecting the conductor metal of the wire being tested in circuit relation with the source of bias potential, a contact member in circuit relation with the source of bias potential disposed to engage the insulated conductor, a resistance element in circuit relation with the source of bias potential to limit the current which may flow through the conductor metal, an indicating device in the output circuit of the electronic relay and responsive to flow of direct current and a source of direct current connected to the output circuit from the input circuit by the electronic relay, the contact member, conductor metal, resistance element, and source of bias potential being disposed to establish an electrical circuit when the contact member makes electrical contact with the conductor metal to effect a change of the bias potential at the electronic relay, the change of bias potential producing a flow of direct current from the input circuit to the output circuit whereby the indicating device is operated.

15. The apparatus as defined in claim 14 in which the indicating device is a neon glow lamp.

CHARLES B. LEAPE.
GERALD R. HAYWOOD.